J. W. Mulley.
Mower.

N° 16599      Patented Feb. 10. 1857

UNITED STATES PATENT OFFICE.

JEREMIAH W. MULLEY, OF AMSTERDAM, NEW YORK.

IMPROVEMENT IN REAPING AND MOWING MACHINES.

Specification forming part of Letters Patent No. 16,599, dated February 10, 1857.

*To all whom it may concern:*

Be it known that I, JEREMIAH W. MULLEY, of Amsterdam, in the county of Montgomery and State of New York, have invented a certain new and useful Improvement in Reaping and Mowing Machines; and I hereby declare that the following is a full, clear, and exact description thereof, reference being had to the accompanying drawings, in which—

Figure 1:
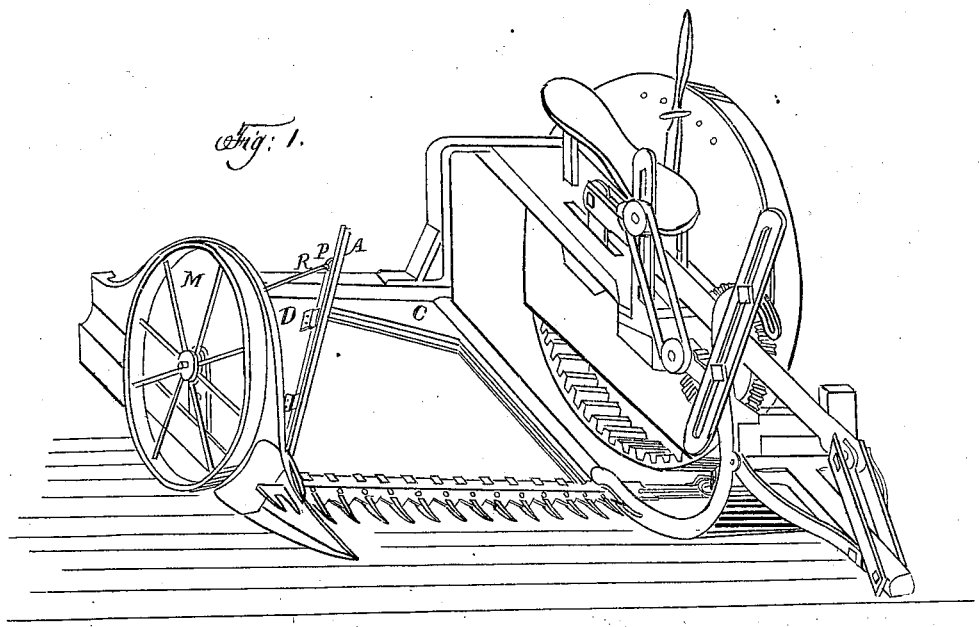
Figure 2:
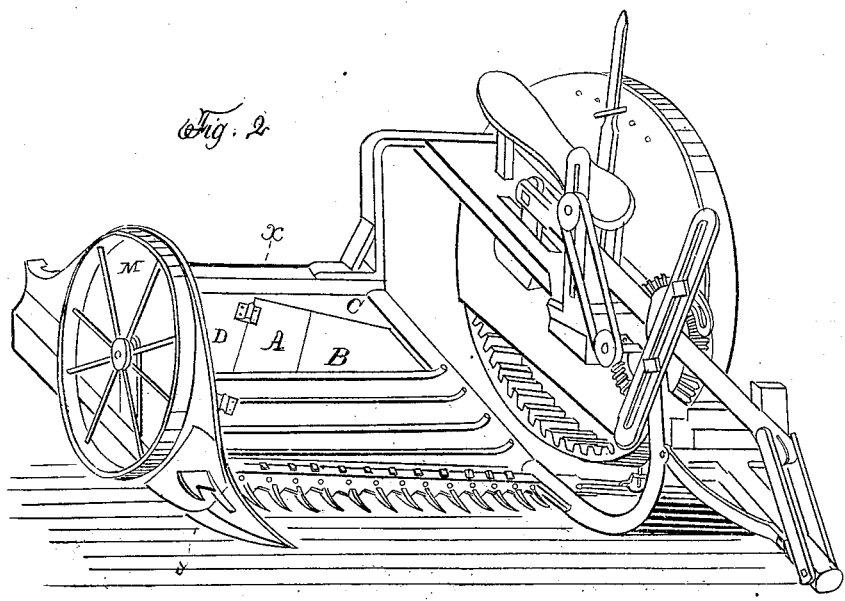

Figures 1 and 2 are perspective views of my improved machine, showing the platform arranged for reaping and for mowing.

My invention relates to a new mode of constructing the platform of combined reaping and mowing machines, as hereinafter fully described.

In harvesters operating without the immediate attendance of gatherers or binders who follow up the machine during the performance of its work for the purpose of clearing the track, so that the machine shall not meet with incumbrance in its way, it is important that it should be so constructed and arranged as to allow the raker to throw the grain for the sheaf sidewise or out of the track which the team has to follow in its next turn.

My machine has a square or quadrangular platform, from which the raker throws under the raker's stand or seat—*i. e.*, between the platform and the driving-wheel—such a quantity of grain, which has fallen upon the platform, as will be sufficient to form a sheaf.

When a machine is to be converted into a mower it should be so constructed and arranged that their conversion should neither take up much time nor require much manipulation and mechanical qualification on the part of the operator. Moreover, it is desirable that no extra pieces foreign to the machine should be introduced as an attachment thereto, as they are liable to get lost or mislaid; but from the peculiar form of the platform of my machine it would require the introduction of a track-clearer when the platform is removed for the purpose of mowing. I have therefore invented a platform constructed in parts, wherein one or more or all of the parts may be folded up as to serve the purpose of a track-clearer.

The annexed drawings show such a platform divided into four parts, A, B, C, and D. The part A is movable upon the fixed line $xy$, either by hinges or any other suitable joints. It is of the shape of a trapezium wherein the larger base is the axis of rotation. The guard-board M is furnished with a hook, R, which, engaging into the eye P, will keep the track-clearer in an upright position when the machine is to mow. The central part, B, is then to be removed. The latter may be so constructed in parts in such a manner as to allow of its being folded up so that no part of the machine need to be removed, therefore not liable to be lost or mislaid. The part D is permanent, and the part C is permanent or not, as may be most convenient.

When the platform is laid down so that the machine may act as a reaper it is covered with a thin metallic plate grooved in the direction of the passage of the rake. This will greatly facilitate that operation.

Having now fully described my improvement, what I claim as my invention, and desire to secure by Letters Patent, is—

Constructing and arranging the platform of combined reaping and mowing machines in parts, when one or more of said parts may occupy, at pleasure, such position in relation to the cutters as to form the track-clearer for mowing or the platform for reaping, in the manner substantially as herein set forth.

In testimony whereof I have signed my name to this specification before two subscribing witnesses.

JEREMIAH W. MULLEY.

Witnesses:
 JOSEPH FRENCH,
 GEORGE S. DEVENDORF.